United States Patent Office 3,781,333
Patented Dec. 25, 1973

3,781,333
BETA,BETA-DIMETHYL ACRYLATES
Heinrich Kappeler, Wurenlos, and Jost Wild, Zurich, Switzerland, assignors to Givaudan Corporation, Clifton, N.J.
No Drawing. Original application Dec. 23, 1968, Ser. No. 786,413, now Patent No. 3,700,717. Divided and this application Aug. 23, 1972, Ser. No. 283,005
Int. Cl. C07c 69/54
U.S. Cl. 260—486 R          1 Claim

ABSTRACT OF THE DISCLOSURE

A synthetic process for producing lavandulol (III) and lavandulyl acetate (V) economically and in pure form is disclosed. This is accomplished by a novel process involving making lavandulic acid (II by the rearrangement of a novel compound, 2-methyl-buten-2-yl-$\beta,\beta$-dimethyl acrylate (I). The lavandulic acid so formed may be reduced to lavandulol (III) or lavandulal (IV), converted into a lower alkyl ester (V) or into the novel lavandulic acid nitrile (VI). Lavandulol (III) may be transformed into the novel lavandulyl $\beta,\beta$-dimethyl acrylate (VII).

This is a division of application Ser. No. 786,413, filed Dec. 23, 1968, now U.S. Pat. 3,700,717.

BACKGROUND OF THE INVENTION

This invention relates to novel processes and products useful in the field of perfumery.

In the past, lavandulol (III) and lavandulyl acetate (V), which are important constituents of essential oils utilized in perfumes and colognes to provide a lavender fragrance, have been produced commercially from their natural plant source, *Lavandula hybrida*. Various synthetic processes have been provided for synthesizing lavandulol and lavandulyl acetate. However, none of these syntheses has proven commercially or economically feasible.

Among the syntheses which have been developed are those by Ruzicka and his collaborators: Helv. Chim. Acta, 18, 439 (1935); 30, 1483 (1947); 34, 2009 (1951); 35, 1656 (1952). In reviewing these syntheses, S. M. Baba et al., Tetrahedron 22, 903 (1966) remark:

"All these interesting syntheses result in mixtures of isomeric compounds and the yields of the final products are unsatisfactory."

A more recent synthesis by P. Tesseire et al., Recherches, 13, 4 (1963), is rather involved and uses difficult procedures like the Wittig reaction. S. M. Baba et al., Tetrahedron, 22, 903 (1966) describe a new and relatively simple synthesis, but they state (p. 904, loc. cit.):

". . . the practical utility of this synthesis still to be ascertained partly depends on the development of a convenient method for the preparation of the parent hydrocarbon."

The X referred to by Baba et al. is 2,6-dimethyl-hepta-2,5-diene; and the desired method still has not been found.

SUMMARY OF THE INVENTION

In accordance with this invention, the olfactorily-useful lavandulol (III) and lavandulyl acetate (V) are formed synthetically, in pure form and in high yield, from lavandulic acid (II) which is made in a novel manner by the rearrangement of the novel 2-methyl-buten-2-yl-$\beta,\beta$-dimethyl acrylate (I).

Also, if desired, the lavandulic acid (II) obtained in accordance with this invention may be reduced to lavandulal (IV), converted into a lower alkyl ester (V) or into the novel lavandulic acid nitrile (VI). Lavandulol (III) thus obtained can, if desired, be transformed into an ester (VII). The lower alkyl ester (V) obtained may, like the acid (II), be reduced to lavandulal (IV).

DESCRIPTION OF THE PREFERRED EMBODIMENTS

The reactions embodied in the preferred embodiments of this invention are shown schematically in the following reaction scheme:

REACTION SCHEME

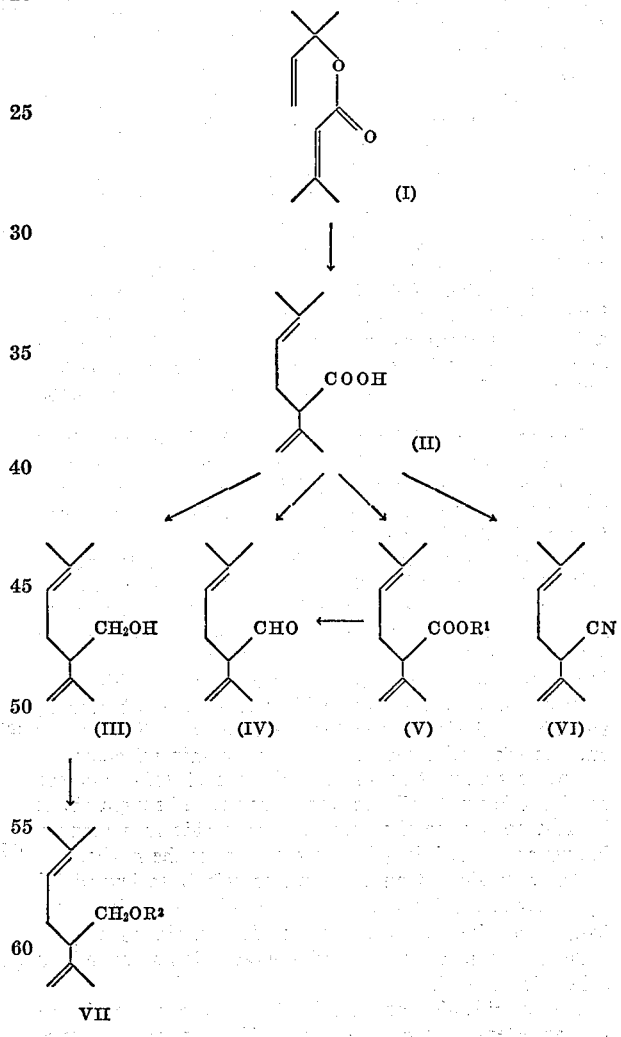

In the above Formulae V and VII, $R^1$ and $R^2$ respectively have the following significance: $R^1$ signifies a lower alkyl group, preferably one with 1–6 C-atoms such as methyl, ethyl, propyl, isopropyl, butyl etc. $R^2$ signifies the acyl residue of a carboxylic acid, especially a lower alkane carboxylic acid with 1–6 C-atoms. Examples of such acyl residues are: formyl, acetyl, propionyl, butyryl, isobutyryl, caproyl etc.

The acrylic acid ester of Formula I used as the starting material can be obtained readily and in high yields by esterification of β,β-dimethylacrylic acid or of a functional derivative thereof (e.g. the acid chloride) with 3-methyl-1-buten-3-ol (e.g. in the form of the corresponding sodium alcoholate).

The rearrangement of the acrylic acid ester (I) into lavandulic acid (II) brought about in accordance with the invention by strong bases proceeds practically quantitatively. The lavandulic acid obtained is completely isomer-free.

Particularly suitable strong bases are strong bases which are capable of splitting off a γ-hydrogen atom in an α,β-unsaturated ester, i.e. alkali hydrides such as sodium hydride; however, there also can be taken in consideration, for example, potassium tert. butylate or butyl lithium.

The rearrangement is conveniently carried out in an inert solvent such as, for example, benzene or toluene at elevated temperature, for example at temperatures between about 50° and about 150°, suitably at reflux temperature, preferably at about 100° C. After completion of the rearrangement reaction, the reaction mixture is conveniently rapidly cooled, for example by pouring onto ice-water. The lavandulic acid can then be isolated according to methods which are known per se, for example by means of ether-extraction.

The transformation of the lavandulic acid (II) obtained into the corresponding primary alcohol (lavandulol, Formula III), the corresponding aldehyde (lavandulal, Formula IV), into lower alkyl esters (V), in to the corresponding nitrile (lavandulic acid nitrile, Formula VI), as well as the esterification of the lavandulol thus obtained (for the purpose of producing esters of Formula VII) and the reduction of esters of Formula V to lavandulal (IV) can be carried out in a manner known per se.

The reduction of the lavandulic acid (II) obtained to lavandulol (III) can, for example, be carried out in ether at lower temperatures, preferably at about 10° C. Lithium aluminium hydride, for example, is suitable as the reducing agent. Diisobutyl aluminium hydride, for example, can also be used instead.

The reduction of the lavandulic acid (II) to lavandulal (IV) can, for example, be accomplished with a reducing agent such as diisobutyl aluminium hydride in the presence of a solvent such as hexane at low temperatures (e.g. at about −70 to −80° C.).

In order to produce esters of Formula V from lavandulic acid (II), known mild esterification methods can be used.

Thus, for example, lavandulic acid methyl ester is obtained in high yields when lavandulic acid is reacted with 1.1 equivalents of diazomethane at room temperature. However, one also may secure the same result with methanol and dry hydrochloric acid as catalyst or when using trimethyl orthoformate in the presence of acidic catalysts such as ion exchangers, Lewis acids or mineral acids.

The transformation of lavandulic acid (II) into the nitrile of Formula VI can, for example, be brought about by first converting the acid into the amide in a manner known per se and dehydrating the latter to the nitrile.

The reduction of an ester of Formula V to lavandulal (IV) proceeds, for example, with diisobutyl aluminum hydride as the reducing agent under conditions already stated above in connection with the reduction of lavandulic acid to lavandulal.

The esterification of lavandulol for the purpose of producing esters of general Formula VII can, for example, be done by reactions of lavandulol (optionally in the form of the sodium alcoholate) with an acylating agent (e.g. an acid halide such as acetyl chloride). For the production of, for example, lavandulyl acetate, isopropenyl acetate can also be used as the esterification agent.

The lavandulic acid and its transformation products of Formulae III–VII obtainable in accordance with the invention are useful as odorants or as intermediates for the manufacture thereof, as aforesaid.

In the following examples, the temperatures are stated in degrees centigrade.

EXAMPLE 1

5 g. of the ester (30 mmols) obtained by esterification of β,β-dimethylacrylic acid with 3-methyl-1-buten-3-ol are added dropwise with stirring at 70° to a suspension of 0.72 g. of sodium hydride (3 mmols) in 11 ml. of toluene. After completed dropwise addition, the temperature of the mixture is elevated during ca 15 minutes to 100° and thereafter cooled. After the addition of a few drops of methanol, the mixture is extracted with ether at 0°. 4.74 g. (95%) of gas-chromatographically uniform lavandulic acid are thus obtained.

The acrylic acid ester used as the starting material can be obtained as follows.

A solution of 150 g. of β,β-dimethylacrylic acid (1.5 mols) in 150 ml. of absolute ether is added dropwise with stirring to 357 g. of thionyl chloride (3 mols) in 150 ml. of absolute ether. After completion of the vigorous reaction, the mixture is heated at 50–60° for a further 4 hours. Subsequently, the ether and the excess thionyl chloride are distilled off under normal pressure. The β,β-dimethylacrylic acid chloride thus obtained is thereafter distilled under reduced pressure. Boiling point 69°/50 mm. Yield: 170 g. (85%).

For the purpose of esterifying the acid chloride thus obtained with 3-methyl-1-buten-3-ol, 94.6 g. of 3-methyl-1-buten-3-ol (1.1 mols) are slowly added dropwise with stirring to a suspension of 48 g. of sodium hydride (1 mol) in 1200 ml. of absolute benzene. In order to exclude moisture, the reaction is carried out under nitrogen. In order to obtain as complete a reaction as possible, the reaction mixture is subsequently boiled under reflux for 4 hours. The mixture is thereafter cooled to 0° and 134.5 g. of β,β-dimethylacrylic acid chloride (1 mol) are slowly added dropwise. During this strongly exothermic reaction, by continuous cooling care is taken that the temperature does not rise above 15°.

After the reaction is completed, 100 ml. of methanol are added to the reaction mixture in order to decompose any sodium hydride still present. The mixture is then poured onto ice and worked up. After the removal of the solvent on the rotary evaporator, the oil thus obtained is distilled at water-jet vacuum. Boiling point 76.5–78°/12 mm.; yield: 160 g. (96%). The ester obtained in this manner is gas-chromatographically pure.

EXAMPLE 2

A solution of 3.9 g. of the lavandulic acid (23.2 mmols) obtained in accordance with Example 1 in absolute ether is added dropwise with ice-cooling to a suspension of 1.62 g. of lithium aluminum hydride in 40 ml. of absolute ether. After stirring for 30 minutes at room temperature, the excess lithium aluminum hydride is decomposed by dropwise addition of acetic acid ethyl ester. The mixture is thereafter poured onto 20% sulphuric acid and extracted at 0° with ether. There are thus obtained 3.54 g. (99%) of lavandulol which is found to be identical with an authentic sample in all respects. IR: 52,984, 53,023; NMR: 1660; UV: 90,342.

EXAMPLE 3

5.05 g. (30 mmols) of lavandulic acid obtained in accordance with Example 1 are dissolved in 15 ml. of abs.

hexane. The solution is cooled to −75°, nitrogen being introduced as an inert gas. 43.5 ml. of a 1.4 M solution of diisobutyl aluminum hydride (corresponding to 60 mmols) in hexane are thereafter added dropwise during ca 3 hours at this temperature to the vigorously stirred solution. After the addition is completed, the reaction mixture is left for two further hours with stirring at this temperature and then 8.5 ml. of absolue ethanol are added. The temperature of the reaction mixture is then allowed to rise to −10° and 108 ml. of a 10% sulphuric acid solution are added at this temperature. For the working up, the reaction mixture is poured onto ice and extracted with pentane or ether. The analysis of the product-mixture obtained shows that, taking unreacted lavandulic acid into account, 70% of the theory of lavandulal and 30% of the theory of lavandulol have been formed. This product-mixture may readily be separated by distillation, pure lavandulal of boiling point 58°/5 mm. Hg (IR: 3000(s.), 2950(s.), 2850, 2730, 1730, 1650, 1450, 1380, 900 cm.−1) and pure lavandulol of boiling point 102°/12 mm. Hg (IR: 3330(s.), 2930(s.), 1650(s.), 1450, 1380, 1040, 890 cm.−1) being obtained.

EXAMPLE 4

1.1 equivalents of an ethereal diazomethane solution are added dropwise to 15 g. of lavandulic acid obtained according to Example 1. The moment of complete reaction may be readily obtained by means of thin layer chromatography. The excess diazomethane is thereafter filtered off by suction, the filtrate taken up in ether and extracted twice with 2 N sodium carbonate solution. After washing neutral and drying, it is evaporated on the rotary evaporator and the residue distilled in water-jet vacuum. There are thus obtained 13.1 g. (81% of the theory) of lavandulic acid methyl ester of boiling point 97°/12 mm. Hg. IR: 2970, 2950, 2920, 2860, 1740, 1650, 1440, 1380, 1160, 900 cm.−1.

EXAMPLE 5

5.05 g. (30 mmols) of lavandulic acid obtained according to Example 1 and 4.17 ml. (30 mmols) of triethylamine are dissolved in 60 ml. of methylene chloride. To this solution there is added dropwise at −5° a solution of 3.24 g. (30 mmols) of chloroformic acid methyl ester in 30 ml. of methylene chloride. After completed addition, the mixture is further stirred at −5° for a further 30 minutes. After this time, the mixture is treated with 0.51 g. (30 mmols) of dry ammonia in 30 ml. of methylene chloride. After stirring for 25 minutes at −5°, the reaction mixture is allowed to further react at room temperature for two further hours. For the working up, the mixtue is poured onto ice, taken up in ether, extracted with 2 N soda solution and 2 N hydrochloric acid solution, washed neutral with saturated common salt solution and dried over sodium sulphate. After removal of the solvent on the rotary evaporator, lavandulic acid amide is obtained in practically quantitative yield (97% of the theory). Melting point: 68.5°.

The dehydration of the amide to the nitrile is best carried out as follows: 4.70 g. (29 mmols) of lavandulic acid amide are dissolved in 5.95 g. (75 mmols) of pyridine and treated with cooling with 6.85 g. (36 mmols) of p-toluenesulphonic acid chloride. The mixture is left overnight at room temperature, the reaction mixture becoming solid. For the working up, the mixture is poured onto ice, taken up in ether, extracted twice with 2 N HCl solution, washed neutral with saturated common salt solution, dried over sodium sulphate and the solvent removed on the rotary evaporator. The crude product thus obtained is subjected to a distillation. There are thus obtained 3.74 g. (87% of the theory) of pure lavandulic acid nitrile of boiling point 83°/10 mm. Hg. IR: 3000, 2960, 2280, 1660, 1450, 1390, 1180, 910 cm.−1. Odor: green note slightly reminiscent of anise, very fresh.

EXAMPLE 6

12.0 g. (66 mmols) of lavandulic acid methyl ester (obtained in accordance with Example 4) are dissolved in 30 ml. of dry hexane. The solution is cooled to −78° with exclusion of moisture in a nitrogen atmosphere. 51.7 ml. of a 1.4 M diisobutyl aluminium hydride solution (72.5 mmols) in hexane are thereafter added dropwise at this temperature in the course of about an hour with good stirring. After completed dropwise addition, the mixture is further stirred at ca −75° for a further 2 hours and then 7 ml. of absolute ethanol are added dropwise within ca 10 minutes at this temperature. The temperature of the reaction mixture is then allowed to rise to −10° and the reaction mixture is hydrolyzed at this temperature with 150 ml. of a pre-cooled 10% sulphuric acid solution. For the working up, the mixture is poured onto ice and extracted with ether or pentane. After the evaporation of the solvent, there are obtained 8 g. of a crude product (88% of the theory) which is subjected to a distillation. In this manner there are obtained 3.54 g. of pure lavandulal (40% of the theory) of boiling point 58°/5 mm. Hg (IR: 3000, 2950, 2850, 2730, 1730, 1650, 1450, 1380, 900 cm.−1) and 3.1 g. of a 90% fraction (34% of the theory). The remaining products are lavandulic acid methyl ester and lavandulol.

EXAMPLE 7

A mixture of 17.85 g. (178 mmols) of isopropenyl acetate and 25 mg. of p-toluenesulphonic acid is added dropwise to 10 g. (65 mmols) of lavandulol (manufactured in accordance with Example 2). The reaction mixture is then heated at reflux until no more lavandulol can be detected (ca 6 hours). For the working up, the mixture is poured onto ice, taken up in ether, washed with bicarbonate solution and finally dried over sodium sulphate. After evaporation of the solvent, the residue is distilled in high vacuum. There are thus obtained 9 g. (71% of the theory) of pure lavandulyl acetate of boiling point 70°/1.6 mm. Hg. IR: 2930, 2900, 1750, 1650, 1450, 1380, 1240, 1040, 900 cm.−1.

EXAMPLE 8

6.28 g. (40 mmols) of lavandulol (manufactured in accordance with Example 2) are added dropwise with stirring and with introduction of nitrogen to a suspension of 1.80 g. of sodium hydride dispersion (50%, 37.5 mmols) in 40 ml. of dry benzene. After the addition has been completed, the reaction mixture is heated at reflux under nitrogen for ca 3 hours. The mixture is then cooled to 0° and 4.38 g. of β,β-dimethylacrylic acid chloride are added dropwise. The mixture is thereafter allowed to further react at room temperature for ca a further hour. For the working up, the mixture is poured onto ice, taken up in ether, extracted with 2 N NaOH solution and washed neutral with saturated common salt solution. After the evaporation of the solvent, the residue is subjected to a high-vacuum distillation. There are thus obtained 5.5 g. (66% of the theory) of pure lavandulyl β,β-dimethylacrylate of boiling point 85°/0.1 mm. Hg. IR: 3000, 2950, 1725, 1650, 1450, 1235, 1150, 1080, 895, 850 cm.−1. Odor: fine, clean, herby note.

EXAMPLE 9

5.0 g. of lavandulol (32.5 mmols) manufactured in accordance with Example 2 are added dropwise at room temperature to a suspension of 1.56 g. of sodium hydride dispersion (50%, 32.5 mmols) in 40 ml. of dry benzene and heated at 40° for 2½ hours. The mixture is thereafter cooled to 0° and 3.9 g. (32.5 mmols) of α-methylbutyric acid chloride are added dropwise. After the addition is completed, the mixture is allowed to further stir at room temperature for a further hour. The whole reaction is carried out under nitrogen as an inert gas. For the working up, the reaction mixture is poured onto ice and extracted with ether. There are thus obtained 6.3 g. (81% of the theory) of lavandulyl α-methylbutyrate of boiling point 62°/0.03 mm. Hg. IR: 2980, 2940, 2880, 1740, 1650, 1470, 1460, 1380, 1190, 1155, 895 cm.$^{-1}$.

EXAMPLE OF A SCENTED COMPOSITION, SO-CALLED HAY TYPE, CONTAINING THE COMPOUND OF FORMULA VI

| | Parts per weight |
|---|---|
| Lavandulic acid nitrile (compound of Formula VI) | 30 |
| Citral | 10 |
| Eugenol | 10 |
| Linalooloxide | 10 |
| Oil of sage (Czech) | 20 |
| Phenylethylacetate | 20 |
| α-Ionone | 20 |
| Ylang ylang synth. | 20 |
| Anethole | 20 |
| 2,6,10-trimethyl-9-undecen-1-al, 10% | 20 |
| Peppermint oil (Ital.) | 40 |
| Amylsalicylate | 40 |
| Red thymian oil | 50 |
| Linalool | 50 |
| Coumarin | 100 |
| Lavender oil | 100 |
| Californian orange oil | 120 |
| Linalylacetate | 160 |
| Phthalic acid-diethylester | 160 |
| | 1000 |

EXAMPLE OF A SCENTED COMPOSITION, SO-CALLED ROSE TYPE, CONTAINING THE COMPOUND OF EXAMPLE 8

| | Parts per weight |
|---|---|
| Lavandulyl β,β-dimethyl acrylate (compound of Example 8) | 70 |
| α-Ionone | 5 |
| Ylang ylang Bourbon | 5 |
| Vanillin, 10% | 5 |
| 3,7-dimethyloctanol | 10 |
| Caprylaldehyde, 10% | 10 |
| Phenylacetaldehyde, 10% | 15 |
| Lavandulol | 20 |
| Ethyl ester of methylphenylglycidic acid, 10% | 20 |
| Geranium oil Bourbon | 20 |
| Trichloromethylphenylcarbinolacetate | 20 |
| Geranylacetate | 30 |
| Linalool | 40 |
| Citral B pure, 10% | 40 |
| Citronellol laevo | 80 |
| Phenylethylalcohol | 100 |
| Lavandulylacetate | 120 |
| Geraniol | 200 |
| Nerol extra | 200 |
| | 1000 |

What is claimed is:
1. 2-methyl-buten-3-yl-2-β,β,-dimethyl acrylate.

References Cited

UNITED STATES PATENTS 3,493,650   2/1970   Dunkel _____ 260—486 R

LORRAINE A. WEINBERGER, Primary Examiner

P. J. KILLOS, Assistant Examiner

UNITED STATES PATENT OFFICE
CERTIFICATE OF CORRECTION

Patent No. 3,781,333          Dated December 25, 1973

Inventor(s) Heinrich Kappeler et al

It is certified that error appears in the above-identified patent and that said Letters Patent are hereby corrected as shown below:

Column 1, line 19, "2-methyl-buten-2-yl-$\beta,\beta$-dimethyl acrylate" should read -- 2-methyl-buten-3-yl-2-$\beta,\beta$-dimethyl acrylate --.

Column 2, line 2, "2-methyl-buten-2-yl-$\beta,\beta$-dimethyl acrylate" should read --2-methyl-buten-3-yl-2-$\beta,\beta$-dimethyl acrylate ---.

Signed and Sealed this

Twenty-fourth Day of August 1976

[SEAL]

Attest:

RUTH C. MASON
*Attesting Officer*

C. MARSHALL DANN
*Commissioner of Patents and Trademarks*